(No Model.)

J. M. HOWARD.
DRIP CUP FOR BOTTLES.

No. 551,547. Patented Dec. 17, 1895.

WITNESSES:
Jos. A. Ryan
Chas. R. Wright

INVENTOR
J. M. Howard
BY Munn & Co.
ATTORNEYS.

UNITED STATES PATENT OFFICE.

JAMES M. HOWARD, OF NEWBERNE, NORTH CAROLINA.

DRIP-CUP FOR BOTTLES.

SPECIFICATION forming part of Letters Patent No. 551,547, dated December 17, 1895.

Application filed June 5, 1895. Serial No. 551,782. (No model.)

*To all whom it may concern:*

Be it known that I, JAMES M. HOWARD, of Newberne, in the county of Craven and State of North Carolina, have invented a new and useful Improvement in Drip-Cups for Bottles, of which the following is a specification.

The object of my invention is to provide a cup for catching the drip of bottles, or that which runs down the sides thereof, after its contents or a portion thereof has been poured out, thereby preventing the soiling of the table or other article upon which the bottle is placed.

A further object of the invention is to provide such a cup which can be easily and quickly attached to or detached from a bottle.

A still further object of the invention is to provide a cup of the character indicated which is very simple and inexpensive.

The invention consists in the particular construction and arrangement of parts, as hereinafter fully described, and pointed out in the claims.

Reference is to be had to the accompanying drawing, forming a part of this specification, in which similar letters of reference refer to corresponding parts in all the views.

Figure 1:
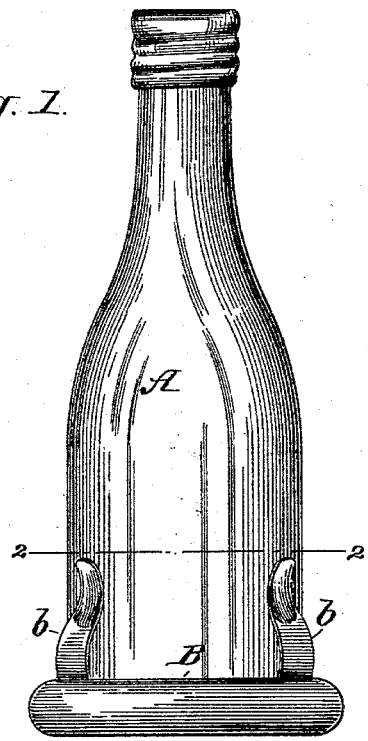
Figure 2:
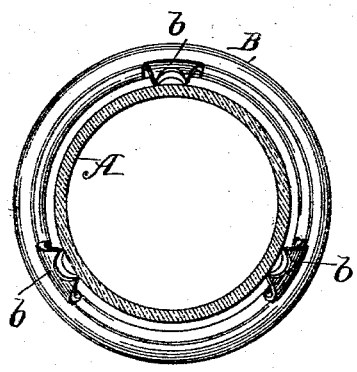
Figure 3:
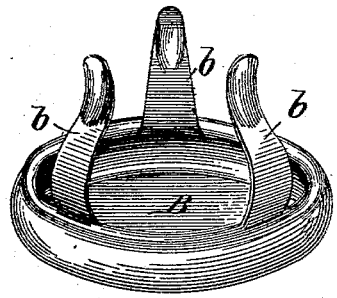
Figure 4:
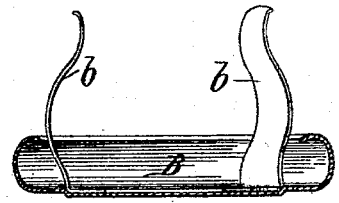

Figure 1 is a side elevation of a bottle having my improvement applied. Fig. 2 is a section on line 2 2, Fig. 1. Fig. 3 is a perspective view of the cup, and Fig. 4 is a sectional view of another form of the cup.

A is a bottle, and B the improved cup applied thereto. The cup B, which may be formed of any suitable material, is provided with the spring-fingers $b$, which, when the bottle is inserted in the cup, clasp the bottle and firmly hold the cup thereon. The cup is curved inwardly at the top, as shown, so as to prevent the contents thereof from running out when the bottle, to which it is applied, is tipped to pour out its contents. The bottom of the cup may be plain, as shown in Fig. 4, or it may be formed with a bead, as shown in Figs. 1, 2, and 3.

The cup is preferably formed with three spring-fingers $b$, which are curved in cross-section, as best shown in Figs. 2 and 3, so that they will only contact with the bottle at their edges, thereby permitting any drip running down the sides of the bottle opposite the fingers to pass between the fingers and bottle into the cup. The fingers $b$, as shown in Figs. 1, 2, and 3, project from the upper edge of the cup, and may be integral therewith, as shown in said figures, or they may be soldered or otherwise secured thereto. As shown in Fig. 4, the fingers $b$ are separate from the cup and are secured to the bottom thereof, so as to project up within the cup. In this form of cup the fingers are not curved. Since the fingers are within the cup, any drip will readily pass into the said cup.

It will thus be seen that by my improvement any drip from a bottle will be caught and prevented from running out when pouring out the contents of the bottle, thereby effectually preventing the soiling of the table or other article upon which the bottle rests.

It will also be seen that the cup can be quickly and easily applied to a bottle and as readily removed and that it is very simple and cheap.

Having thus described my invention, what I claim is—

1. As a new article of manufacture, a drip cup for bottles, comprising a cup having its upper edge curved inwardly and provided with spring fingers projecting upwardly from the said curved edge, said fingers being formed of strips curved transversely, whereby the said fingers will contact with the bottle at their edges only, thereby permitting the drip running down the sides of the bottle opposite the fingers to pass between the said fingers and bottle into the cup, as set forth.

2. As a new article of manufacture, a drip cup for bottles consisting of a cup having its upper edge curved inwardly and provided with spring fingers projecting upwardly from the said curved edge, the said fingers being integral with the body of the cup and curved longitudinally and transversely, as specified.

JAMES M. HOWARD.

Witnesses:
JOHN W. STEWART,
WILLIAM N. PUGH.